(12) United States Patent  (10) Patent No.: US 8,832,955 B2
Petter et al.  (45) Date of Patent: Sep. 16, 2014

(54) BRA SIZE MEASURING TAPE (75) Inventors: Jamie Petter, Cape Coral, FL (US);
Donna Mines, Fort Myers, FL (US)

(73) Assignee: Chico's Brands Investments, Inc., Fort Myers, FL (US)

( * ) Notice: Subject to any disclaimer, the term of this patent is extended or adjusted under 35 U.S.C. 154(b) by 183 days.

(21) Appl. No.: 13/247,576

(22) Filed: Sep. 28, 2011

(65) Prior Publication Data
US 2013/0074353 A1  Mar. 28, 2013

(51) Int. Cl.
*A41H 1/02* (2006.01)
*G01B 3/10* (2006.01)
*A41C 1/00* (2006.01)

(52) U.S. Cl.
CPC ............... *A41H 1/02* (2013.01); *G01B 3/1082* (2013.01); *A41C 1/00* (2013.01)
USPC ................... 33/512; 33/759; 33/679.1

(58) Field of Classification Search
USPC ........... 33/512, 755, 756, 759, 679.1
See application file for complete search history.

(56) References Cited

U.S. PATENT DOCUMENTS

| | | | |
|---|---|---|---|
| 2,527,206 A | 10/1950 | Amyot | |
| 2,559,501 A | 7/1951 | Graf | |
| 2,575,343 A | 11/1951 | Heiman | |
| 2,946,125 A | 7/1960 | Gittelson | |
| 3,292,261 A | 12/1966 | Hayes | |
| 4,454,409 A | 6/1984 | Sehres | |
| 5,406,715 A | 4/1995 | Koizumi et al. | |
| 5,414,943 A * | 5/1995 | Vogt | 33/764 |
| 5,485,855 A | 1/1996 | Shiraiwa et al. | |
| 5,619,804 A | 4/1997 | Vogt et al. | |
| 5,965,809 A | 10/1999 | Pechter | |
| 6,272,761 B1 * | 8/2001 | Pechter | 33/512 |
| 6,276,069 B1 | 8/2001 | Chadwick et al. | |
| 6,336,839 B1 | 1/2002 | Valli | |
| 6,467,180 B1 | 10/2002 | Chan | |
| 6,530,159 B2 * | 3/2003 | Tarver, III | 33/759 |
| 6,640,460 B1 | 11/2003 | Nabarro | |
| 7,164,962 B2 | 1/2007 | Petterson | |
| 7,730,631 B2 * | 6/2010 | Delaurier | 33/759 |

FOREIGN PATENT DOCUMENTS

| | | |
|---|---|---|
| JP | 9-280978 | 10/1997 |
| JP | 2003119609 A | 4/2003 |
| WO | WO 02/39052 A1 | 5/2002 |

\* cited by examiner

*Primary Examiner* — Christopher Fulton
(74) *Attorney, Agent, or Firm* — Grossman, Tucker, Perreault & Pfleger, PLLC (57) ABSTRACT

A tape measuring device for determining bra sizes has band dimension and bra size markings on the outer surface of the tape. The band dimension markings divide a section of the surface by standard units and subunits of band size. The band size markings on the outer surface allow the user to determine the proper band size for a bra based on a single measurement, without the need for any additional calculations or correlations. The bra size markings on the outer surface allow the user to directly determine the proper cup and overall bra size based on the band size determination, again without the need for any additional calculations or correlations.

9 Claims, 9 Drawing Sheets

BRA SIZE MEASURING TAPE

FIELD OF INVENTION

The present invention relates to the field of measuring and testing devices. More particularly, the invention relates to a measuring tape and system for use in quickly and accurately determining bra sizes.

BACKGROUND OF INVENTION

The process of bra fitting is complicated by variations in size, shape and disposition of breasts. Many women are never measured for a bra and not instructed how a bra should fit. Young women purchasing their first bras are often uncomfortable with seeking advice. Women often merely rely on previous experience for roughly estimating the size required, which process can result in poorly fitting garments considering changes in breast size and shape that occur during life.

Often, a bra is selected based on a favorite style or make, regardless of the accuracy of the fit. As a result, the customer may purchase a bra which fits improperly.

Finding a correctly fitting bra is further complicated by the problem that many women fall in between the designations on standard sizing systems.

Poorly fitting bras are uncomfortable and often provide insufficient support, which, in turn can lead to various health problems. This is especially true during the teenage years.

Bra sizing is traditionally done by determining two specific values: band size and cup size.

Band size, typically expressed in inches in the United States, is conventionally determined first by measuring the circumference around the wearer's torso immediately below the breasts (the "underbust" measurement) with a conventional tape measure then adding several—typically five—inches (a "torso factor") to arrive at the correct band size.

Cup size, typically expressed as a letter size, is conventionally determined by first taking a measurement of circumference around the wearer's torso at the "apex" or fullest part of the breasts (the "overbust" measurement) then calculating the difference between the apex or overbust measurement and the band size. By standard practice, a difference of one inch corresponds to an A cup, two inches to a B cup, three inches to a C cup, and so on.

It can be seen that this traditional method of bra sizing is complicated; the process often produces errors that result in improper size selection and poorly fitted garments. Previous inventors have sought to address this deficiency. A harness-type bust measuring apparatus having an adjustable horizontal measuring tape or strip and at least a pair of vertically disposed measuring tapes or strips trained through the horizontal tape is disclosed in U.S. Pat. No. 2,946,125. However, measurement of band, chest or torso size as necessary values to be used in the determination of cup size is not done using this device. Further, the device requires that it be worn by the user while the measurement is being made, which can be inconvenient and uncomfortable.

Another bust measuring apparatus known in the art has separate measuring tapes for taking band size and apex measurements combined into a single circular device. The device clips onto the center back strap of a person wearing a bra. After band and apex measurements are taken, cup size is found by lining up the appropriate values found for band and apex into a "conversion wheel"—a type of circular conversion table where the calculated value sought appears in a cut out window when the corresponding band and apex dimensions are lined up correctly on the face of the wheel—incorporated into one side of the device.

While some of the complexity associated with bra sizing is alleviated by allowing the user to determine bra size by "dialing" the appropriate band size and apex measurements into the conversion wheel once known, that device still requires the user to convert the previously obtained band size and apex measurements in order to arrive at the proper cup and bra size. Since this step requires that the user not only remember the measurements taken, but also to line up the corresponding measurements on the conversion wheel correctly, the possibility for error still remains significant.

Further, the user is also required to wear the device on the center of the back strap of their bra in order to obtain proper measurements, which can make using this device more time consuming, awkward, and uncomfortable to obtain bra size measurements than taking the same measurements conventionally with a single flexible tape measure.

A method where bra size is determined by direct measurement of the breast is disclosed in U.S. Pat. No. 5,965,809. The method disclosed determines cup size by directly relating it to measurement of the circumference of each unclothed (bare) breast, with a single flexible tape measure used to measure each breast laterally from the beginning of one side of the breast mound to the parastemal area medially. While this method takes some of the complexity out of bra sizing by directly measuring the breast itself, several shortcomings are evident.

The need for measurements of the bare breast may result in socially awkward situations when another person is responsible for taking the wearer's measurements, such as would commonly occur in a retail setting, since many women would not feel comfortable having a "fit specialist" put measuring tape to a bare breast in order to obtain the required dimensions.

Self-measurement of the required dimensions can also be difficult and inaccurate due to the awkwardness involved with having the wearer keep the tape positioned in the right place around the bust while taking the measurements; movement of the arms up or down can change torso measurements, so even relatively small changes in arm position can introduce significant error into the measuring process.

Additionally, a direct cross-measurement of the bare breast—regardless of who does the Measuring-may not always be an accurate means of determining cup size. Since cup size is a function of capacity or volume, two women may have different cross-measurements due to differences in the position and shape of their bare (unsupported) breasts, but actually require the same sized cup.

Further, even though the breast is measured directly, a conversion calculation wherein a measurement of seven inches is converted to an "A" size, eight inches to a "B" size, nine inches to a "C" size, and so on, is still required, which increases the potential for error.

U.S. Pat. No. 6,467,180 provides a measuring device in the form of a two-sided flexible tape for determining bra sizes comprising a length of material having an outer surface and an inner surface.

In one embodiment of the U.S. Pat. No. 6,467,180, the outer or front surface of the measuring device is used to determine an underbust measurement, and has a set of sequential dimension and band size markings printed on it. These markings divide the front surface by standard units of length (typically inches and subunits thereof). Additional band size indicator markings printed beneath the length markings on the front surface allow the corresponding band size for each measurement to be read directly from the front surface immediately after obtaining the underbust measurement. The inner or back surface of the measuring device is used to determine cup size and overall bra size, and has a set of sequential dimension and bra size markings printed on it. These markings divide the back surface by standard units of length (typically inches and subunits thereof). Additional bra size indicator markings printed beneath the length markings allow the corresponding bra size to be read directly from the back surface after first determining the proper band size using the front surface as described above, then taking a measurement of the apex circumference using the back surface. The '180 patent states that while its measuring device is described as including linear measurements on the first line of the measurement device, that the band and bra sizes can be determined directly from the measurement device without taking actual circumference measurements. However, the device of the '180 patent as described in its single practical embodiment requires the one determining bra size to take and recall both band size and overbust size measurements. This sequence, in turn, necessitates using both sides of the measuring tape of the '180 patent in obtaining the customer's bra size.

SUMMARY OF THE INVENTION

It is an object of the present invention to provide a flexible measuring tape for determining bra size and containing on one side thereof indicia for directly measuring band size.

A further object of the present invention is to provide a bra measuring device in which bra size can be determined directly beneath the band size indicia.

Still another object of the present invention is to provide a flexible bra measuring tape in which only one side of the tape need be used for obtaining bra size.

A further object of the present invention is to provide a bra measuring device containing indicia enabling the correct measurement of a woman whose underbust measurement is closest to a half size, for example, an underbust measurement of 26.5 inches as opposed to 26 or 27 inches.

Still a further object of the present invention is to provide a bra measuring device containing indicia providing the cross cup grade sizes corresponding to a measured bra size.

These and other objects of the present invention which will be apparent to the skilled artisan are provided by the flexible measuring tape of the present invention.

The invention allows bra size to be determined quickly and accurately, without the need for calculations or conversions, using a single measuring device to directly provide overall bra side and without the need to take any measurements in units of length.

The outer or front surface of the measuring device is used to directly determine a band size measurement, and has a set of sequential band size markings printed on it. These band size markings divide the upper central longitudinal front surface by units of band size length, typically inches and subunits thereof. Numerical length units corresponding to the actual length of the measuring tape are omitted from the front side of the tape. Thus, band size can be read directly from the outer or front surface of the measuring tape without first obtaining an underbust measurement.

The outer or front surface of the measurement device of the invention is also used to determine cup size and overall bra size, and has sets of bra size markings printed on it. These bra size indicator markings are found beneath the band size markings and allow the bra size to be read directly from the front surface of the device after first determining the proper band size, without the need to take an overbust measurement in units of length.

In use it is merely necessary to loop the measuring tape around the woman in the manner to take an underbust measurement, reading the band size directly from the front surface of the tape where the point of measurement intersects the beginning of the tape, and then raising the tape for looping the tape around the woman in the manner to take an overbust measurement, and directly reading the bra size where the point of measurement intersects the beginning of the tape, based on the bra size listed for the previously determined band size.

In one embodiment of the present invention, the inner or back side of the measuring device is divided into units of length and subunits thereof, typically inches or centimeters.

There has thus been outlined, rather broadly, the more important features of the invention in order that the detailed description thereof that follows may be better understood, and in order that the present contribution to the art may be better appreciated. There are, of course, additional features of the invention that will be described further hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception upon which this disclosure is based may be readily utilized as a basis for the designing of other structures, methods and systems for carrying out the several purposes of the present invention. It is important, therefore, that equivalent constructions insofar as they do not depart from the spirit and scope of the present invention, are included in the present invention.

For a better understanding of the invention, its operating advantages and the aims attained by its uses, references should be had to the accompanying drawings and descriptive matter which illustrate preferred embodiments of the invention.

BRIEF DESCRIPTION OF THE DRAWINGS

FIG. 1 illustrates the two sides of a measuring device in accordance with the invention, it being understood that the present invention can be practiced with the use of a measuring device only containing the indicia shown on the front side of the tape depicted in FIG. 1. For the purpose of illustrating the entire length of the measuring device depicted in FIG. 1, FIG. 1 has been subdivided into FIGS. 1A through 1G. The upper band of FIG. 1 depicts the front or outer side of the inventive measuring device, while the lower band of FIG. 1 depicts the back or inner side of the inventive measuring device in the inventive embodiment in which length measurement units are marked on that side of the device.

DETAILED DESCRIPTION OF THE INVENTION

The present invention will now be discussed, with reference to illustrations of an embodiment of the measuring device, as it would be used in the determination of bra size.

Bra size can be determined by only using the outer or front side 2 of the measuring device 1 to first determine band size and then to determine cup and overall bra size.

Figure 1A:
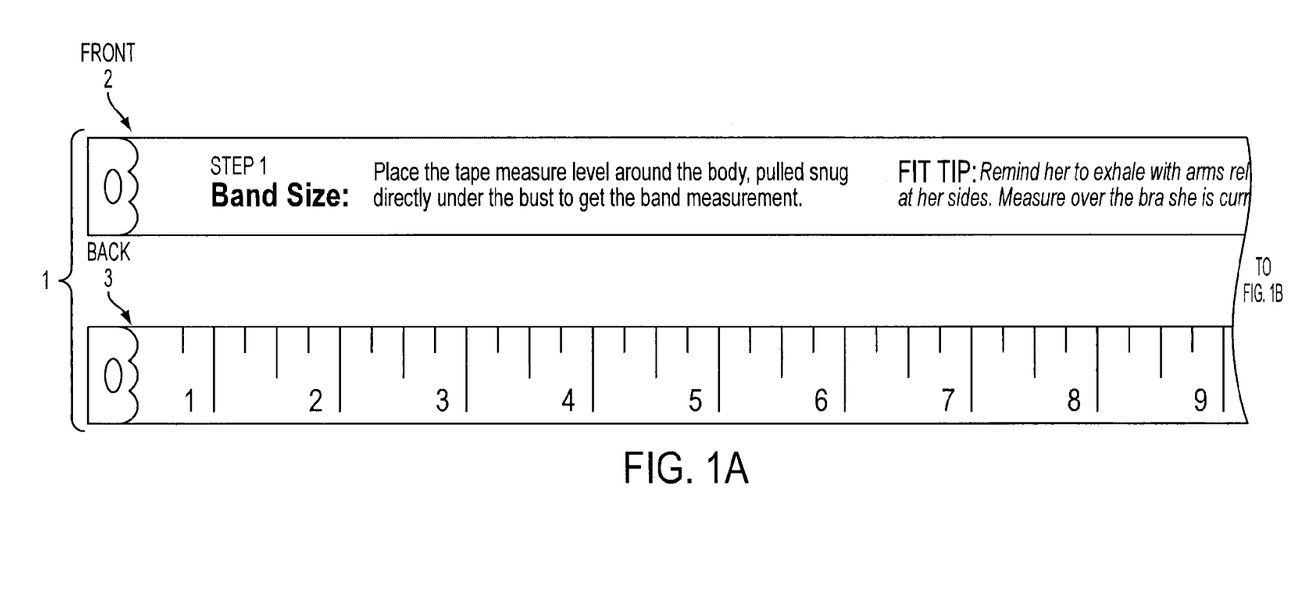
Figure 1B:
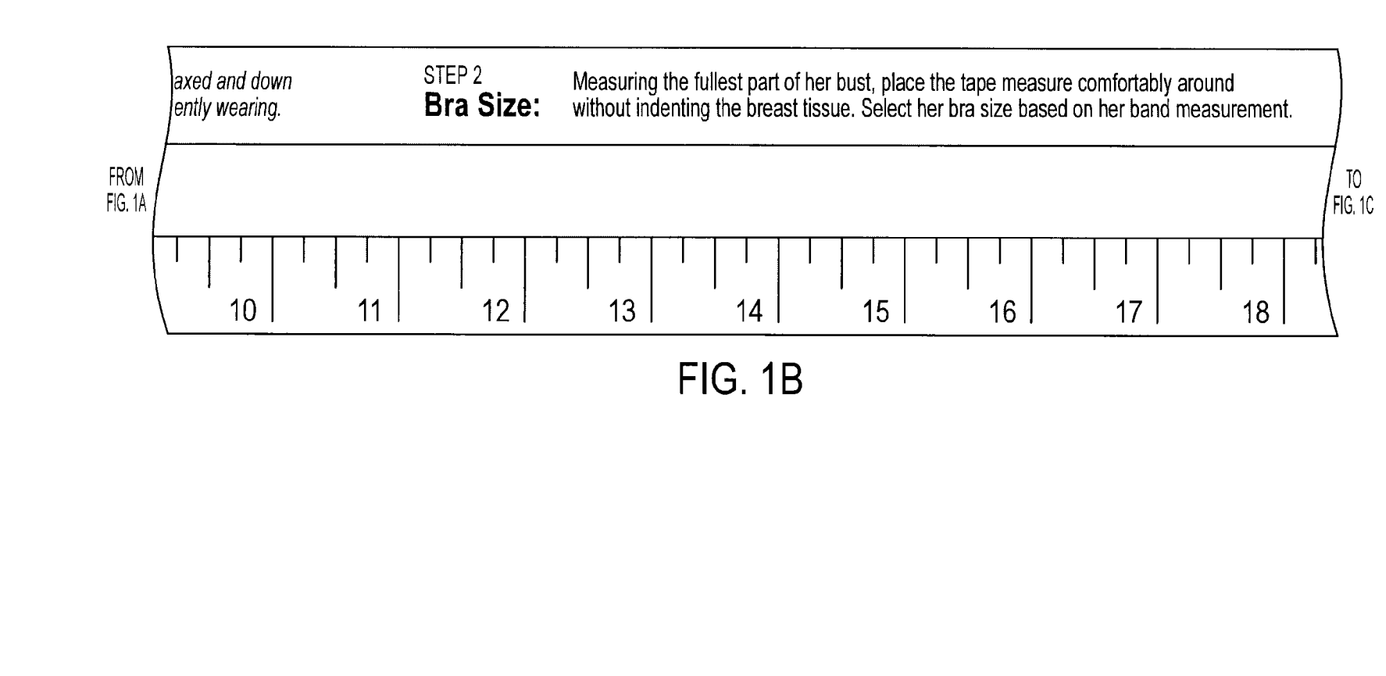
Figure 1C:
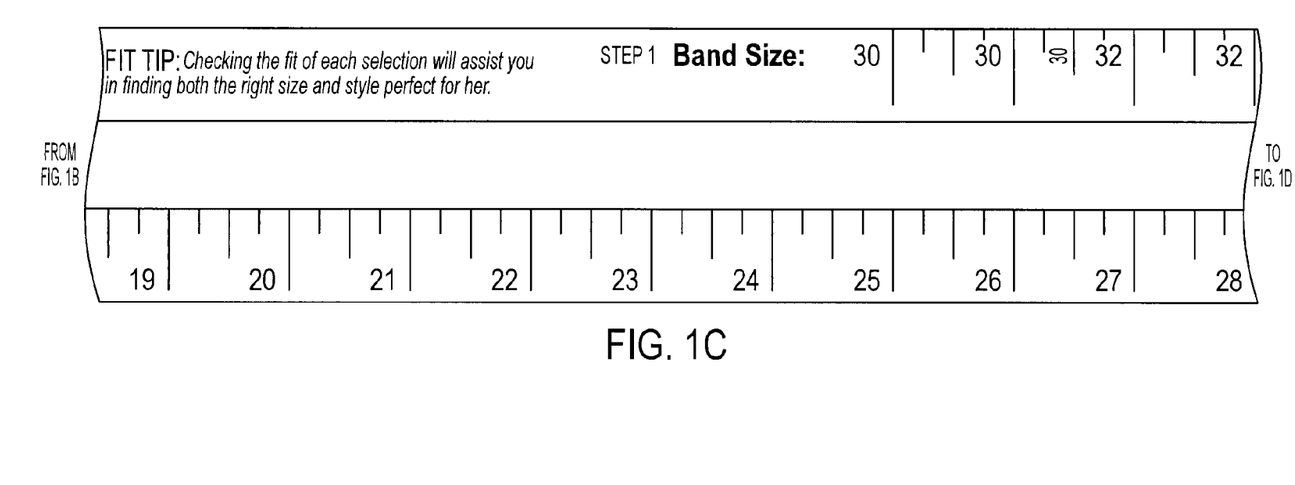
Figure 1D:
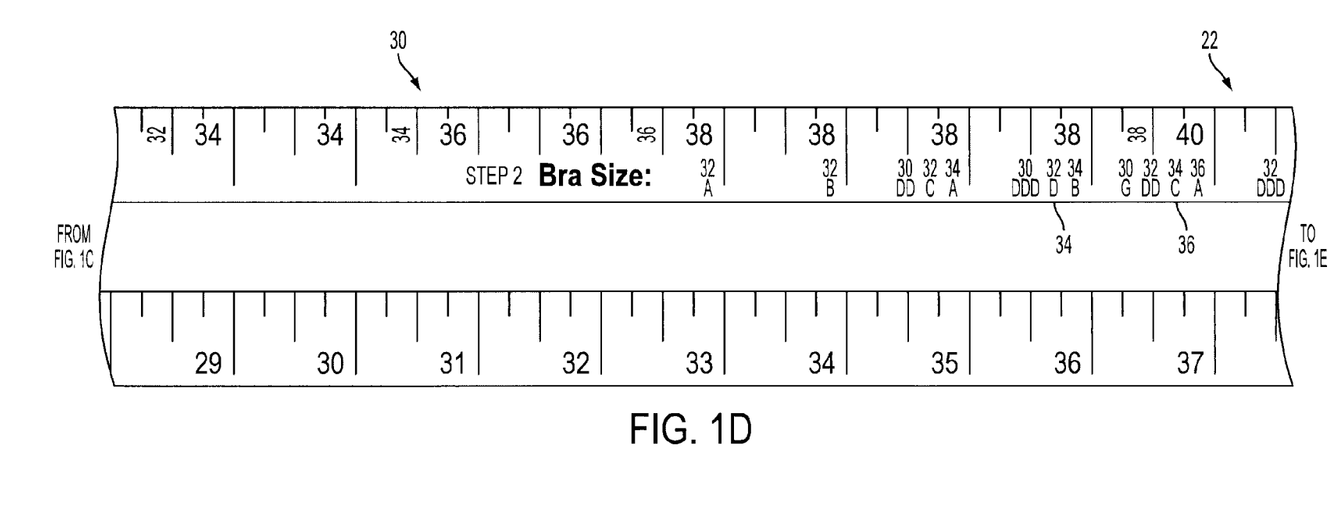
Figure 1E:
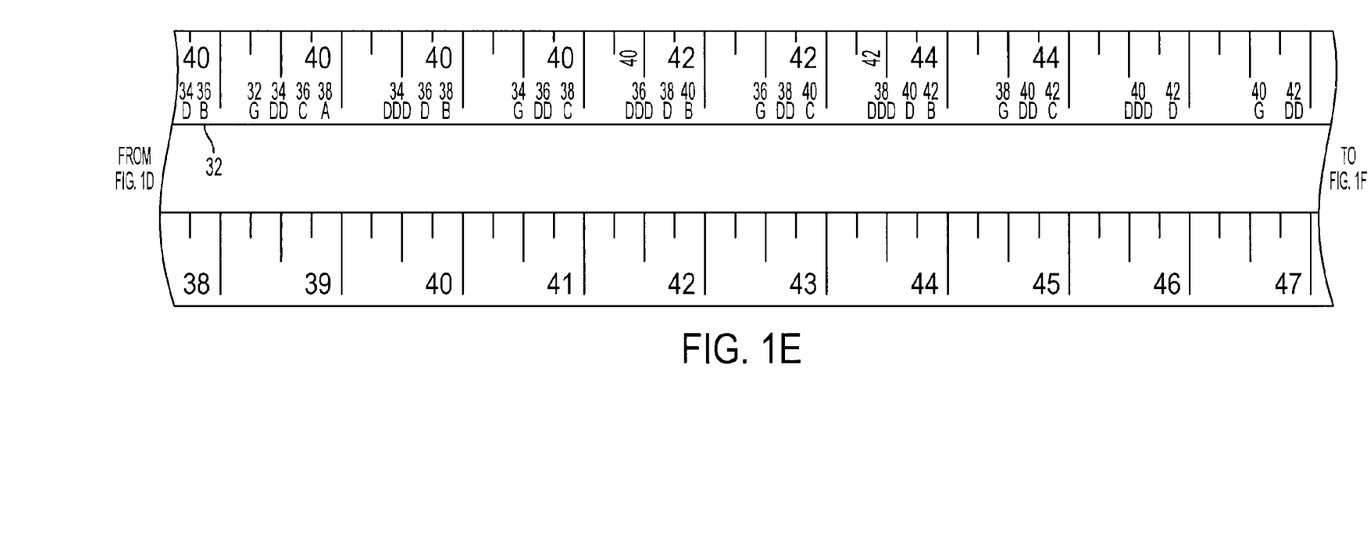
Figure 1F:
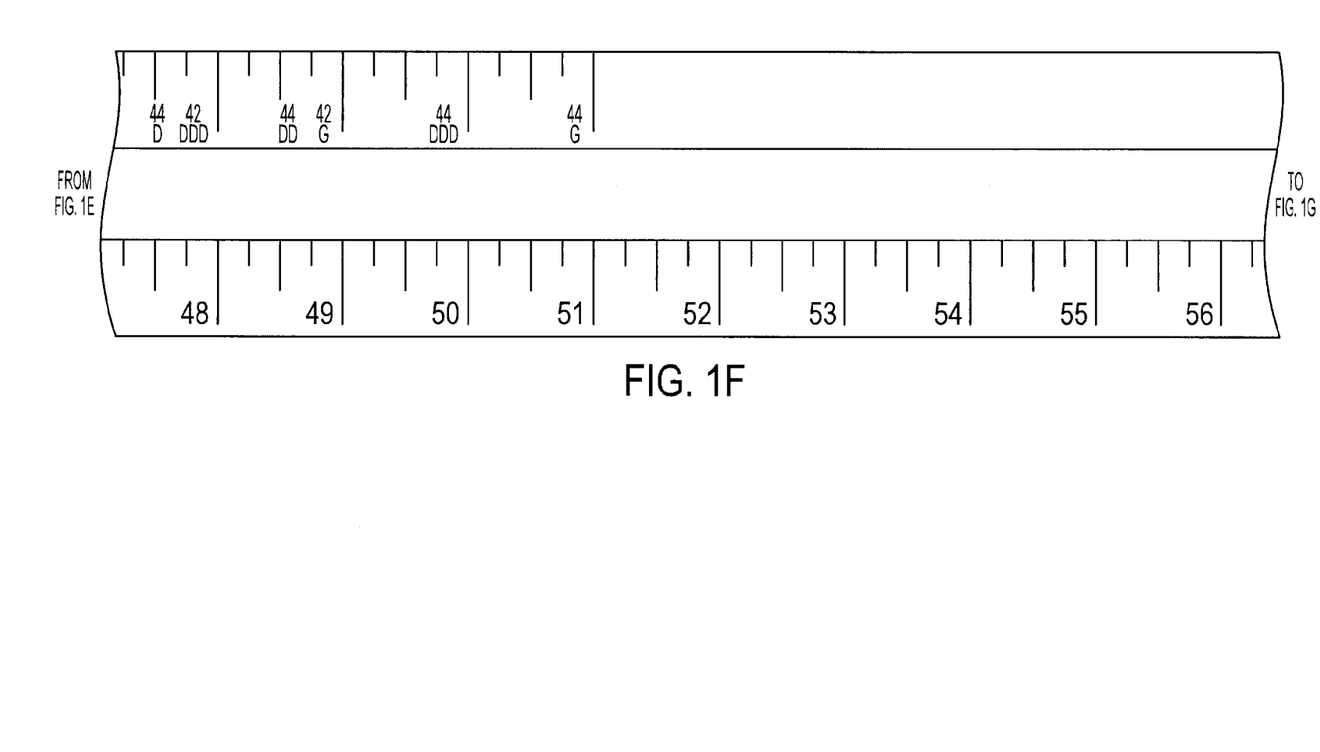
Figure 1G:
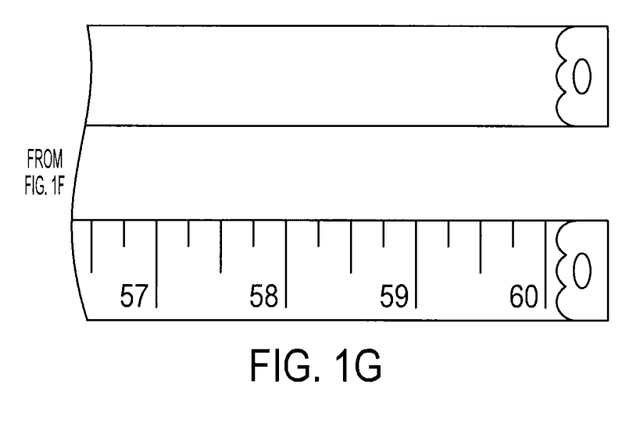
Figure 2:
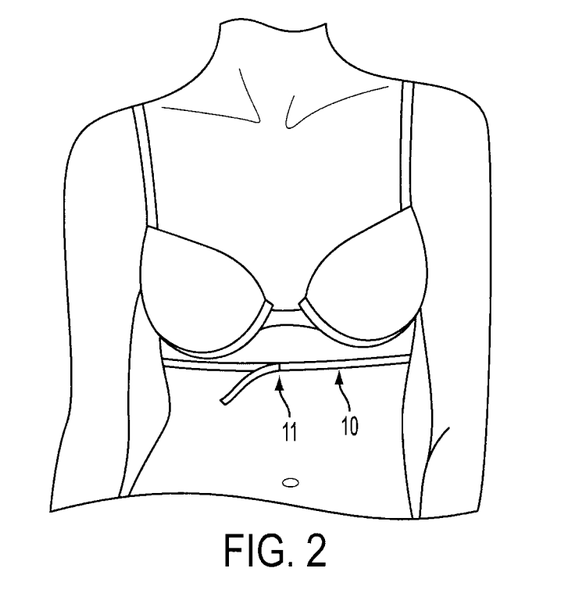
FIG. 2 is a sketch that illustrates proper location for taking a band size measurement for determining band size using the outer or front surface of the measuring device.

With reference to FIGS. 1 and 2, band size is determined first by directly measuring the band size around the wearer's torso at position 10, immediately below the breasts (where the "underbust" measurement would normally be taken) with the outer or front side of the measuring device facing away from the wearer's body. The measuring device should be drawn so that the fit of the loop formed is snug around the torso without being uncomfortable. The band size, generally in inches, can be obtained directly by reading the band size number from the top line of markings on the front surface of the measuring device at the point 11 where the starting point of the measuring device intersects the inner surface of the device, closing the loop around the torso.

The conventional rule of thumb with respect to band size is to add a "torso factor" typically about three to five inches, to the underbust dimension-the measured circumference around the wearer's torso immediately below the breasts. However, experience has taught that this rule overestimates the band size when used for larger, "full figured" women. As a result, in the art, a more accurate, better fitting band size for larger women has been determined by adding a smaller torso factor, typically three inches or less, to the underbust measurement. However, in the present invention, for women with high underbust measurements, the torso factor is often less than three, and at times becomes a negative value. The measuring device disclosed incorporates these features into the band size marking scheme, so that a smaller or even negative torso factor has been added to the theoretical underbust measurement to determine band sizes for women wearing a certain band size, approximately thirty-eight or larger, automatically, resulting in greater accuracy when determining band dimensions for larger sized women. These theoretical features and calculations have been utilized in determining the location of the band size markings on the front side of the inventive measurement device. The absence of any standard units of length from the beginning of the tape being marked on the front surface of the measurement tape allows an accurate band size reading to be obtained without unduly disturbing the customer who may not understand the correct relationship between underbust measurement and band size, especially for larger women. The front side of the inventive tape also avoids guessing the proper band size for underbust measurements in partial length units, such as half inch sizes.

Figure 3:
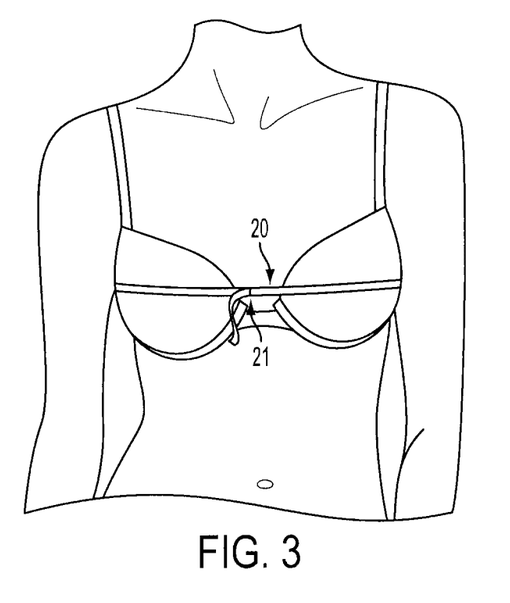
FIG. 3 is a sketch that illustrates proper location for taking a measurement for determining cup and overall bra size, also using the outer or front surface of the measuring device, in conjunction with the previously determined band size.

With reference to FIGS. 1 and 3, cup size and overall bra size can then be determined also using the outer or front surface of the measuring device. With the outer or front surface still facing outward away from the body, the tape is placed around the wearer's torso at the apex or fullest part of the breasts as shown at position 20. This is the point where the apex or overbust circumference, usually in inches, would normally be obtained. Instead, in the present invention, one directly reads the overall bra size from the lower line of markings on the outer surface of the measuring device at point 21 where the starting point of the device intersects the outer surface of the device, closing the loop around the upper torso. In rows below the band size dimensions, the overall bra sizes as expressed in possible band and cup sizes are listed which can be associated with any theoretical overbust dimension. The cup size is based on the difference between the theoretical overbust and underbust dimensions. The bra size, as a number and letter combination (e.g. 34 B), can be read directly from one of the sets of markings in rows beneath the band size at point 21 on the outer surface of the tape. The read marking is the one containing the earlier determined band size. For example, if point 21 is at position 22 on the front of the tape and the previously determined band size was 32, the overall bra size is 32DDD.

The inventive measurement device provides the correct bra size, even for women with an underbust measurement of over 45 inches, up to 51 inches, while also providing the correct bra size for smaller women and teens having underbust measurements of 25 to 26.5 inches.

Where desired, the inner or back surface 3 of the measuring tape contains standard units of length from the beginning of the tape, such as in inches or centimeters. This embodiment of the invention is depicted in FIG. 1, as explained hereinbefore. With such a tape embodiment, where desired, an underbust and/or overbust measurement can be taken. This feature is useful as an aid in training a bra sales associate, and also for explaining the theory behind the direct measurement features of the inventive tape to a customer, where needed. In FIG. 1, the front 2 and back 3 tape surfaces are directly beneath each other, so it is possible to directly correlate underbust measurements to band sizes and to directly correlate overbust measurements to bra sizes.

At times, a woman does not feel comfortable in the measured standard band and cup size as determined with the tape of the present invention. This may occur when the woman's underbust measurement corresponds to a point such as point 30 on the front side of tape 1 in FIG. 1, which is at the point of intersection between band measurements of 34 and 36, corresponding to an underbust measurement of 30.5 inches. In such an instance, the tape of the present invention provides the information needed for cross cup grading. "Cross cup grading" is a term in the foundation industry to describe bra cup capacity, that is, how much breast tissue fits into a bra cup. The tape of the present invention lists the comparable cross cup grading size in the group of bra size designations to either side of the measured size, enabling the fitter to easily convert the woman's measured size into the size of her preference for providing a more custom fit. For example, with a measured band size of 34 as corresponding to an underbust measurement of 30.5 inches, and an overbust measurement of 37 inches, the tape of the present invention provides a measured bra size of 34C. If the customer feels that the 34 band size garment is too tight, and prefers a 36 band size for a more comfortable fit, it is only necessary for the fitter to check for the bra size corresponding to a 36 band size in the next larger size group of markings on the tape, in this instance a bra size of 36B, to provide the comfort preferred by the customer without compromising cup fit. To identify the cross cup grade size to fit the customer's band preference without increasing the cup size she measured, it is only necessary to view the bra sizes depicted in the bra size indicia groupings to either side of the measured size. The inventive tape automatically provides the correct cup size when selecting either up or down in band size. When selecting up in band size, the adjacent indicia will indicate one cup letter size lower and when selecting down in band size, the adjacent indicia will indicate one cup letter size higher, both providing the same cup capacity as with the measured bra size. For example, with the measured bra size of 34C at measurement point 36 on the front side of the measurement tape of FIG. 1, the two cross cup grading sizes providing a larger or smaller band size but the identical cup size to that measured, are 36B and 32D, as indicated by designations 32 and 34 in FIG. 1 on the front side of the measurement tape. Each of these three bra sizes has the same cup capacity. See, in particular FIGS. 1D and 1E.

The measurement tape of the present invention will typically be about ¾ inch in height, but of course other height dimensions could be routinely selected.

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

Having now described a few embodiments of the invention, it should be apparent to those skilled in the art that the foregoing is merely illustrative and not limiting, having been presented by way of example only. Numerous modifications and other embodiments are within the scope of the invention and any equivalent thereto. It can be appreciated that variations to the present invention would be readily apparent to those skilled in the art, and the present invention is intended to include those alternatives.

Further, since numerous modifications will readily occur to those skilled in the art, it is not desired to limit the invention to the exact construction and operation illustrated and described, and accordingly, all suitable modifications and equivalents may be resorted to as falling within the scope of the invention. For example, since the band size markings begin at about 25 inches in from the beginning of the tape, one alternative is to include instructions for use of the tape in bra measurement on the front side of the tape, or to place other indicia in the same section of the front or outer surface of the tape. This is illustrated in FIG. 1 where a two step process for use of the bra measurement tape of the invention is set forth.

What is claimed is:

1. A measuring device for determining bra size consisting of band size and cup size for a bra comprising: a length of material, having
    a first surface and a second surface;
    a first set of band size markings printed upon said first surface of said length of material, said markings including a series of band sizes, each band size theoretically corresponding to an underbust circumference and a torso factor; and
    a second set of bra size markings printed upon said first surface of said length of material, said second set of markings including a series of groups, each group corresponding to a theoretical overbust measurement comprises a standard band and cup size, said cup size being associated with said band size as a function of the theoretical overbust measurement and the underbust circumference, and a plurality of comparable cross cup grading sizes including band sizes and associated cup sizes listed to either side of said standard band and cup size.

2. The device of claim 1 wherein most of said markings printed upon said first surface correspond with standard generally accepted dimensions for band and bra size.

3. The device of claim 1 wherein said first surface is the front, outer surface of the device.

4. The device of claim 3 wherein the back, inner surface of the device is divided into longitudinal sections of length for taking an overbust measurement.

5. The device of claim 4, wherein said back, inner surface of the device includes standard units of length.

6. The device of claim 1 wherein said set of band size markings is set forth in inch designations and includes band size designations in between whole inch designations.

7. A method for determining bra size consisting of a band and cup size by direct measurement comprising the steps of:
    determining a band size measurement by directly and circumferentially measuring the torso immediately below the breasts using a measurement tape having a beginning, an inner side and an outer side, said band size measurement being a function of a torso circumference and a torso factor, and reading said band size from the outer side of the tape at the point where the beginning of the measurement tape intersects the outer side of the measurement tape;
    placing said outer side of the measuring tape around the upper torso at the apex of the breasts, said outer side of the measuring tape lists size markings corresponding to band and cup sizes, grouped by a theoretical overbust measurement, wherein each group comprises a standard band and cup size, said cup size being associated with said band size as a function of theoretical overbust measurement and torso circumference, and a plurality of comparable cross cup grading sizes including band sizes and associated cup sizes listed to either side of said standard band and cup size, and directly reading the bra size and cross cup grade sizes by finding said band size measurement from within the band and cup sizes, grouped at the point where the beginning of the measuring tape meets the outer surface of the measuring tape.

8. The method of claim 7 wherein the bra size determination is used as a guide for facilitating final fitting of a bra.

9. The method of claim 7 wherein an overbust measurement is carried out using the inner side of the tape, said inner side of the tape being divided by units of length.

* * * * *